3,478,105
AMIDES
Jerome G. Kuderna, Jr., and Richard D. Skiles, Modesto, Calif., assignors to Shell Oil Company, New York, N.Y., a corporation of Delaware
No Drawing. Filed Oct. 16, 1967, Ser. No. 675,344
Int. Cl. C07c 103/30; A01n 9/20
U.S. Cl. 260—558         16 Claims

ABSTRACT OF THE DISCLOSURE

Novel ring-substituted atropamides, such as β,2,4-trichloroatropamide, which have biological activity and are precursors to biologically active compounds.

Field of the invention

This invention relates to a novel class of atropamides in which the phenyl moiety is substituted by halogen, nitro or methylsulfonyl.

Description of the prior art

Atropamide, alpha-phenylacrylamide, is a known compound which was prepared over 50 years ago by H. Staudinger and L. Ruzicka (H. Staudinger et al., Ann. der Chemie (Liebigs), 380, 292 (1911)). It is little investigated compound, evidently due to the difficulty of its synthesis and its tendency to polymerize in the presence of acid or free radical catalysts. The compound has, however, been mentioned in the patent literature as a readily polymerizable monomer, e.g., U.S. 2,749,331. Other than atropamide itself, neither of the above publications disclose atropamides which have substituents in the benzene moiety or in the beta position to the carbamoyl group.

Summary of the invention

It is an object of this invention to provide novel ring-substituted atropamides. It is another object to provide novel atropamides which are more stable to polymerization reactions than the prior art atropamide. Still another object is to provide novel ring-substituted atropamides which have biological activity. It is another object to provide novel atropamides which are useful intermediates in the preparation of biologically active compounds.

These objects are accomplished by novel atropamides having the formula

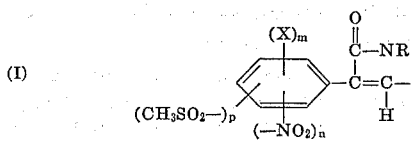

(I)

wherein $R^0$ is hydrogen, halogen or —$NR^2R^3$ in which $R^2$ is alkyl of 1-4 carbon atoms and $R^3$ is hydrogen or alkyl of 1-4 carbon atoms;
R and R' are hydrogen or alkyl of 1-4 carbon atoms;
X is halogen; $m=0–4$, $n=0–2$, $p=0–2$ and $$m+n+p=1-4$$

with the provisos that when $R^0$ is halogen, R and R' are hydrogen, and that at least one of the ortho positions is unsubstituted.

An examination of the compounds of Formula I in which the beta position is substituted with halogen or —$NR^2R^3$ will indicate that the compounds can exist in both the cis- and trans-isomeric forms. Although Formula I is not written to represent isomeric configurations, it is understood that the cis- and trans-isomers as well as mixtures thereof are included within the scope of this invention.

A consideration of Formula I indicates that the benzene ring must be substituted by at least one halogen, methylsulfonyl or nitro substituent. The atropamides may contain 1–4 halogen atoms substituted in the benzene ring. Additionally the benzene ring may contain 1–2 methylsulfonyl or 1–2 nitro substituents. Furthermore, there may be any combination of these substituents in the benzene ring.

The alpha-carbamoyl or alpha-N-alkyl substituted carbamoyl vinyl side chain may be beta unsubstituted, beta substituted by halogen or beta substituted by the residue of a primary or secondary alkylamine, i.e., $R^0$ is either hydrogen, halogen or —$NR^2R^3$. The first proviso recitation restricts the alpha substituent to carbamoyl when the beta substituent is halogen. The second proviso means that when $m+n+p>1$, one ortho position on the benzene ring must be unsubstituted.

The invention atropamides, therefore, may contain a total of five halogen atoms, two methylsulfonyl radicals or two nitro groups distributed as defined by Formula I.

Typical halogen ring-substituted atropamides of the invention include the mono-halo ring-substituted atropamides:

when $R^0$ is hydrogen;
2-fluoroatropamide, 3-chloroatropamide,
4-bromoatropamide, 2-fluoro-N,N-dimethylatropamide,
3-bromo-N-butylatropamide,
4-chloro-N-ethylatropamide and the like;
when $R^0$ is halogen,
β,2-difluoroatropamide, β,3-diiodoatropamide,
β,4-dichloroatropamide,
and the like;
and when $R^0$ is —$NR^2R^3$;
2-fluoro-β-(butylamino)-atropamide,
3-chloro-β-(methylamino)-atropamide,
4-bromo-β-(dimethylamino)-atropamide,
2-chloro-β-(methylamino)-N,N-dimethylatropamide,
3-bromo-β-(isopropylamino)-N-methylatropamide,
4-chloro-β-(dimethylamino)-N-methylatropamide,
2-bromo-β-(methylethylamino)-N,N-diethylatropamide
and the like.

The dihalo ring-substituted atropamides include:

when $R^0$ is hydrogen;
2,3-dibromoatropamide, 2,4-difluoroatropamide,
2,5-dichloroatropamide, 3,4-dichloroatropamide,
2,4-dichloro-N,N-dimethylatropamide,
2,5-dibromo-N-methylatropamide,
3,4-dichloro-N,N-diethylatropamide,
3,5-dibromo-N-propylatropamide,
3,5-dichloroatropamide,
3,5-dichloro-N-ethylatropamide
and the like;
when $R^0$ is halogen;
β,2,3-trichloroatropamide,
β,2,5-tribromoatropamide,
β,2,4-trichloroatropamide,
β,3,4-trichloroatropamide,
β,3,5-trichloroatropamide
and the like; and when $R^0$ is —$NR^2R^3$;
2,3-difluoro-β-(methylamino)-atropamide,
2,4-dichloro-β-(ethylamino)-artopamide,
2,5-dibromo-β-(methylamino)-N-methylatropamide,
3,4-dichloro-β-(methylamino)-N,N-dimethylatropamide,
2,4-dichloro-β-(ethylamino)-atropamide,
2,3-dichloro-β-(dimethylamino)-N-ethylatropamide,
2,4-dibromo-β-(methyl-n-propylamino)-N-methyl-N-ethylatropamide, 3,5-difluoro-β-(diethylamino)-N-methylatropamide
and the like.

Representative trihalo and tetrahalo ring-substituted atropamides are:

when R° is hydrogen;

2,3,4-tribromoatropamide,
2,3,5-tribromoatropamide,
2,4,5-trichloroatropamide,
2,3,5-trifluoroatropamide,
3,4,5-trichloroatropamide,
2,3,4-trichloro-N-methylatropamide,
2,4,5-tribromo-N,N-dimethylatropamide,
3,4,5-trichloro-N-methylatropamide,
2,3,4,5-tetrachloroatropamide and the like; when R° is halogen;

β,2,3,4-tetrachloroatropamide,
β,3,4,5-tetrabromoatropamide,
β,2,3,5-tetrachloroatropamide,
β,2,3,4,5-pentachloroatropamide and the like; and when R° is —NR²R³;

2,3,4-tribromo-β-(methylamino)-atropamide,
3,4,5-trichloro-β-(ethylamino)-atropamide,
2,3,5-trichloro-β-(methylamino)-atropamide,
2,3,4-tribromo-β-(methylamino)-N-methylatropamide,
3,4,5-trichloro-β-(methylamino)-N-propylatropamide,
2,3,5-trifluoro-β-(ethylamino)-N-methylatropamide,
2,3,4-trichloro-β-(dimethylamino)-atropamide,
3,4,5-trifluoro-β-(methylethylamino)-atropamide,
2,3,5-trichloro-β-(diethylamino)-N-methylatropamide,
2,3,5-trichloro-β-(dimethylamino)-N,N-diethylatropamide,
2,3,4,5-tetrachloro-β-(methylamino)-atropamide,
2,3,4,5-tetrachloro-β-(methylamino)-N-methylatropamide and the like.

The ring-substituted atropamides of this invention also include those with 1–2 nitro groups substituted in the benzene ring. Thus, the invention includes the mono- and dinitro ring-substituted atropamides.

Typical mono-nitro ring-substituted atropamides includes:

when R° is hydrogen;

2-nitroatropamide,
3-nitroatropamide,
4-nitroatropamide,
2-nitro-N-butylaminoatropamide,
3-nitro-N,N-diethylatropamide,
4-nitro-N-methyl-N-ethylatropamide and the like; when R° is halogen;

β-chloro-2-nitroatropamide,
β-bromo-3-nitroatropamide,
β-fluoro-4-nitroatropamide and the like; and when R° is —NR²R³;

2-nitro-β-(methylamino)-atropamide,
2-nitro-β-(methylamino)-N-methylatropamide,
3-nitro-β-(ethylamino)-atropamide,
4-nitro-β-(dimethylamino)-N,N-dimethylatropamide and the like.

Typical dinitro ring-substituted atropamides include:

when R° is hydrogen;

2,3-dinitroatropamide,
2,4-dinitroatropamide,
2,5-dinitroatropamide,
3,4-dinitroatropamide,
2,3-dinitro-N-methylatropamide,
2,5-dinitro-N,N-diethylatropamide,
3,4-dinitro-N-methyl-N-ethylatropamide,
2,4-dinitro-N-isobutylatropamide and the like; when R° is halogen;

β-chloro-2,3-dinitroatropamide,
β-bromo-2,4-dinitroatropamide,
β-fluoro-2,5-dinitroatropamide,
β-chloro-3,4-dinitroatropamide and the like; and when R° is —NR²R³;

2,3-dinitro-β-(methylamino)-N-methylatropamide,
2,4-dinitro-β-(diethylamino)-N-methyl-N-n-propylatropamide,
2,5-dinitro-β-(dibutylamino)-N,N-dimethylatropamide,
3,4-dinitro-β-(dimethylamino)-N-methylatropamide and the like.

The ring-substituted atropamides of this invention also include those with 1,2 methylsulfonyl groups substituted in the benzene ring.

Typical mono-(methylsulfonyl) ring-substituted atropamides include:

when R° is hydrogen;

2-(methylsulfonyl)-atropamide,
3-(methylsulfonyl)-atropamide,
4-(methylsulfonyl)-atropamide,
2-(methylsulfonyl)-N-methylatropamide,
4-(methylsulfonyl)-N,N-dimethylatropamide and the like; when R° is halogen;

β-chloro-2-(methylsulfonyl)-atropamide,
β-bromo-4-(methylsulfonyl)-atropamide,
β-iodo-3-(methylsulfonyl)-atropamide and the like; and when R° is —NR²R³;

2-(methylsulfonyl)-β-(methylamino)-atropamide,
3-(methylsulfonyl)-β-(methylamino)-N-methylatropamide,
4-(methylsulfonyl)-β-(dimethylamino)-N,N-dimethylatropamide and the like.

Typical di(methylsulfonyl) ring-substituted atropamides include:

when R° is hydrogen;

2,4-di-(methylsulfonyl)-atropamide,
2,3-di-(methylsulfonyl)atropamide,
3,5-di-(methylsulfonyl)-atropamide,
2,4-di-(methylsulfonyl)-N-methylatropamide,
2,5-di-(methylsulfonyl)-N,N-dimethylatropamide and the like; when R° is halogen;

β-chloro-2,4-di-(methylsulfonyl)-atropamide,
β-bromo-2,5-di-(methylsulfonyl)-atropamide,
β-chloro-2,3-di-(methylsulfonyl)-atropamide and the like; and when R° is —NR²R³;

2,4-di-(methylsulfonyl)-β-(methylamino)-atropamide,
2,5-di-(methylsulfonyl)-β-(dimethylamino)-atropamide,
3,4-di-(methylsulfonyl)-β-(methylamino)-atropamide,
2,5-di-(methylsulfonyl)-β-methylamino)-N-methylatropamide and the like.

As noted in Formula I, the atropamides of this invention may contain combinations of halogen, nitro and methylsulfonyl substituents in the benzene ring, i.e., when $$m+n+p>1$$

the substituents may be different. Thus, within the restrictions of the provisos for the atropamides represented by Formula I, the invention atropamides include the monohalomononitro-, monohalo-polynitro-, polyhalo-mononitro- and polyhalo-poly-nitroatropamides such as 2-chloro-3-nitroatropamide,
2-bromo-3,4-dinitrotropamide,
2,5-dichloro-4-nitroatropamide,
2,5-dichloro-3,4-dinitroatropamide and the like; the monohalo-monomethylsulfonyl-, monohalo-poly-methylsulfonyl-, the polyhalo-monomethylsulfonyl- and the polyhalo-polymethylsulfonylatropamides such as 2-chloro-4-(methylsulfonyl)-atropamide,
2-chloro-3,5-di-(methylsulfonyl)-atropamide,
2,5-dichloro-3-(methylsulfonyl)-atropamide,
2,5-dichloro-3,5-di-(methylsulfonyl)-atropamide and the like; the mononitro-monomethylsulfonyl-, the mononitro - polymethylsulfonyl-, the polynitro - monomethylsulfonyl- and the polynitro-polymethylsulfonyl-atromides such as 2-nitro-5-(methylsulfonyl)-atropamide,
2,4-di-(methylsulfonyl)-5-nitroatropamide,
2,5-dinitro-3-(methylsulfonyl)-atropamide,
2,5-dinitro-3,4-di-(methylsulfonyl)-atropamide and the like; and those atropamides having one or more each of the halogen, nitro and methylsulfonyl substituents in the benzene ring such as 2-chloro-4-nitro-5-(methylsulfonyl)-atropamide,
2,5-dichloro-3-nitro-4-(methylsulfonyl)-atropamide,
3-bromo-2,4-dinitro-5-(methylsulfonyl)-atropamide,
2-chloro-3-nitro-4,5-di-(methylsulfonyl)-atropamide
and the like.

This last subclass of atropamides also contains, within the proviso restrictions, those with a halogen or the residue of a primary or secondary amine in the beta position, i.e., R° is halogen or —NR²R³ and those where the carbamoyl group is N-alkyl substituted, i.e., one or both of R and R' is alkyl.

The invention also includes those atropamides containing mixed halogen atoms, i.e., when more than one halogen substituent is present in the atropamides, they may be different.

The atropamides of the invention are biologically active, being useful as herbicides. In addition, a certain subclass of ortho-haloatropamides within Formula I, defined hereinafter, are valuable intermediates in the synthesis of the corresponding ortho-haloatroponitriles. These ortho-halo-atroponitrile exhibit high herbicidal and microbicidal activities.

An important advantage of the ring-substituted atropamides of the invention over atropamide is the relative stability of the invention atropamides compared to the prior art atropamide. While atropamide is a readily polymerizable monomer in the presence of acids or free-radical catalysts, the invention ring-substituted atropamides do not show any tendency to polymerize in acids or even when heated in the presence of benzoyl peroxide. The advantages of working with stable compounds in organic synthesis will be immediately appreciated to those skilled in the art. The stability characteristics are also important when using compounds as active biological chemicals.

Description of the preferred embodiments

Although the halogen substituents dentoted by the symbols X and R⁰ in the above formula may be selected from any of the halogens, e.g., fluorine, chlorine, bromine, and iodine, the preferred atopamides are those wherein the symbols denote middle halogen, i.e., chlorine or bromine. Accordingly, a preferred class of atropamides of this invention is that wherein any halogens present in the X and R⁰ positions are middle halogen.

Mainly because of availability of the starting materials and ease of synthesis, those ring-substituted atropamides of Formula I wherein X is halogen, preferably chlorine or bromine, $m=0-4$, preferably 0–3, $n=0$ or 1, $p=0$ or 1 and $m+n+p=1-4$, preferably 1–3, with the remaining symbols being as previously described, form a preferred subclass.

Another preferred subclass of ring-substituted atropamides are the ortho-haloatropamides which are valuable intermediates to the corresponding ortho-haloatroponitriles. As previously noted, these ortho-haloatroponitriles have a high degree of herbicidal and microbicidal activity. These ortho-haloatropamides can be represented by the formula (II) 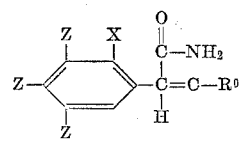

in which R⁰ is hydrogen or halogen, X is halogen and each Z, which may be the same or different, is hydrogen, halogen or nitro, with the proviso that only two of the three Z's may represent nitro.

As is evident from Formula II, only one ortho position may be substituted. Thus, this subclass of atropamides must contain an ortho-halogen atom. Additionally, the 3- 4- and 5-positions on the benzene ring may contain 0–2 nitro groups, 0–3 halogen atoms or a combination of these substituents.

Preferably, any halogen present in the R⁰, X and Z positions is middle halogen, since this leads to the more active ortho-halotroponitrile.

Even more preferred because of their precursor status to the ortho-halotroponitriles having a high microbicidal activity, are those of Formula II in which R⁰ is hydrogen or chlorine, X is chlorine and each Z, which may be the same or different, is hydrogen or chlorine. These ortho-haloatroponitriles are described in greater detail in (P–3177 US entitled "Microbiocides" by Calvin A. Page filed on even date herewith) copending Ser. No. 675,329, filed Oct. 16, 1967.

The atropamides of the invention are useful as herbicides, i.e., for killing or inhibiting the growth of unwanted plants. They are primarily useful in pre-emergence applications.

The atropamides may also be used in the form of herbicidal compositions. These herbicidal compositions contain the conventional inert carriers, i.e., the liquid or solid agents normally associated with herbicidal compositions.

Suitable solid carriers are clays, silicates, synthetic hydrated silicon dioxides, resins, waxes, synthetic polymeric materials, carbon, sulfur and the like. Liquid carriers include water, alcohols, ketones, aromatic hydrocarbons and petroleum fractions such as kerosene.

In addition to the carrier, the herbicidal composition may contain a surface active agent which may be anionic, cationic or non-ionic. Examples of suitable surface active agents include alkylaryl sulfonates, alkyl sulfates containing up to 10 carbon atoms, alkylphenol/ethylene oxide condensates, sorbitan esters of fatty acids, alkylamide sulfonates, ethylene oxide/fatty acid ester condensates and the like.

The herbicidal composition containing the inert carrier and/or surface active agent may be formulated as a wettable powder, a dust, granules, a concentrate, a solution, an emulsifiable concentrate, etc.

The amount of the atropamide necessary to kill or inhibit the growth of plants is defined as the herbicidal amount. This quantity will obviously vary with the species of atropamide, the plant species, type of formulation, environmental conditions and the like. Under a particular set of conditions, however, it is readily determined, e.g., by the use of controls. In field applications, usually the atropamides will be effective at 10 pounds per acre, although higher amounts, up to 50 pounds per acre, may sometimes be necessary.

The herbicidal composition will usually contain from about 0.001–95% by weight of the active ingredient, i.e., the atropamide, based on the total weight of active ingredient and carrier.

Preparation

The atropamides of Formula I wherein R° is hydrogen or halogen, R and R' are both hydrogen and at least one ortho position is unsubstituted, may be prepared by hydration-dehydration of the appropriate acetophenone cyanohydrins (alphamethylmandelonitriles). Such cyanohydrins are derived by the reaction of acetophenones with hydrogen cyanide by known methods.

Exemplary acetophenone precursors are

2'-chloroacetophenone,
2,2'-dibromoacetophenone,
2,2',5'-trichloroacetophenone,
2',4',5'-trichloroacetophenone,
2,2',4',5'-tetrachloroacetophenone,
2,3',4',5-tetrachloroacetophenone,
2,4'-dibromo-3'-nitroacetophenone,
2',3'-dichloro-4',5'-dinitroacetophenone,
4'-chloroacetophenone,
4'-(methylsulfonyl)-acetophenone,
2'-chloro-4'-(methylsulfonyl)-acetophenone,
2'-nitro-5'-(methylsulfonyl)-acetophenone,
2'-chloro-3'-nitro-4'-(methylsulfonyl)-acetophenone,
2,2'-dichloro-3'-(methylsulfonyl)-4'-nitroacetophenone
and the like.

The acetophenones may be prepared by reaction of the appropriate substituted benzene with a haloacetylchloride in the presence of aluminum chloride followed by decomposing the resulting complex with ice and hydrochloric acid. This orthodox Friedel-Crafts ketone synthesis is described in Fieser and Fieser, Organic Chemistry, second edition, 1950, at pages 576-7.

The cyanohydrins are readily prepared by the liquid phase reaction of the appropriate acetophenone with hydrogen cyanide. The method is described in Fieser and Fieser, Organic Chemistry, second edition, 1950, at pages 205-6.

The reaction of the cyanohydrin with a dehydrating agent to form the atropamide can be illustrated thusly:

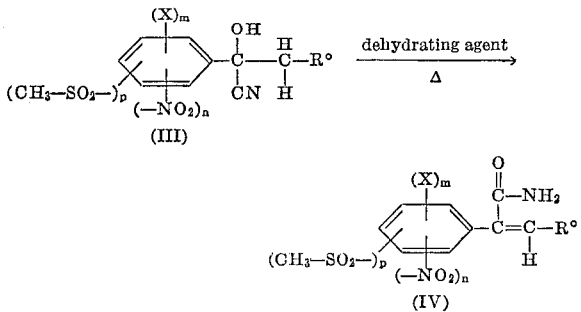

in which $R°$ is hydrogen or halogen, X, $m$, $n$, and $p$ are as previously defined in Formula I. The reaction is carried out in the liquid phase at moderately elevated temperatures, i.e., from about 35° C. to about 150° C. The reaction proceeds at a satisfactory rate at temperatures from about 80° C. to about 110° C., a preferred range.

The dehydrating agent used, which usually serves as the reaction medium also, is sulfuric acid of at least 70% of the concentration of $H_2SO_4$ in commercial concentrated sulfuric acid. In most cases, it will be found desirable to use sulphuric acid of at least 80% strength, on the same basis, and in many cases, better results are obtained with concentrated sulfuric acid. The proportion of sulfuric acid to cyanohydrin can vary over a wide range; however, there should be sufficient $H_2SO_4$ present to insure a liquid phase reaction medium.

The atropamides, which are usually colorless solids at room temperature, may be isolated by cooling the reaction medium and separating the amide by filtration or other conventional techniques for separating solids and liquids. The atropamide may then be purified by recrystallization from a suitable solvent such as carbon tetrachloride and then dried.

The β-alkylamino substituted atropamides having the formula

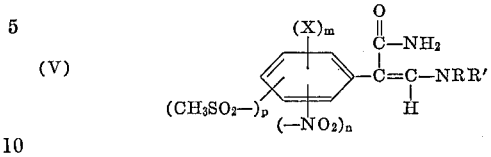

wherein R is alkyl of 1-5 carbon atoms and R' is hydrogen or alkyl of 1-4 carbon atoms and the other symbols are as previously described, may be prepared by a liquid phase reaction of the appropriate β-halogen substituted atropamide with a primary or secondary amine.

Suitable primary amines include methylamine, ethylamine, propylamine, isopropylamine, butylamine, isobutylamine and the like while the secondary amines are exemplified by methylethylamine, diethylamine, ethylpropylamine, dipropyamine, diisopropylamine, propylbutylamine, dibutylamine and the like.

The liquid phase reaction is conveniently carried out in a suitable organic solvent at temperatures from about 25° to about 150° C.; the reflux temperature of the reaction medium being a convenient method. Suitable solvents include the aliphatic and aromatic hydrocarbons such as pentane, hexane, cyclohexane, benzene, toluene, the xylenes; the chlorinated aliphatic and aromatic hydrocarbons such as propyl chloride, butyl chloride, methylene chloride, chlorobenzene, the chlorotoluenes and the like, are also suitable. Other useful solvents include the alcohols such as methyl alcohol, ethyl alcohol, isopropyl alcohol and the like. Mixtures of the above solvents may also be used.

The reaction is conveniently carried out by dissolving the β-halogen substituted atropamide in the solvent and adding this solution to a solution of the amine. The amine is usually present is at least 100% excess of the stoichiometric quantities. After the completion of the reaction, the dissolved product is isolated by conventional procedures such as evaporation of the solvent, washing with water to remove any amine salt, and recrystallizing from a suitable solvent and dried.

The N-substituted and β-alkylamino N-substituted atropamines may be prepared by reacting a primary or secondary amine with the corresponding acid chloride, i.e., atropoyl chloride or β-halogen substituted atropolyl chloride. The acid chloride, in turn, is readily prepared from the acid, i.e., the atropic acids by conventional techniques. The acids are prepared by the action of nitrous acid on the corresponding amides, i.e., the β-halogen substituted or β-unsubstituted atropamide. The reaction may be illustrated thusly:

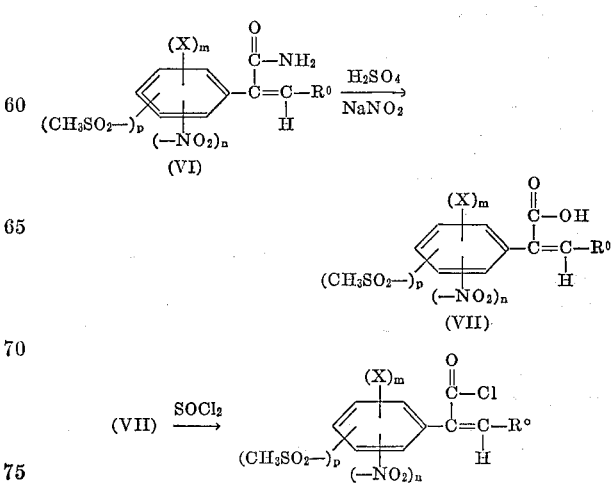

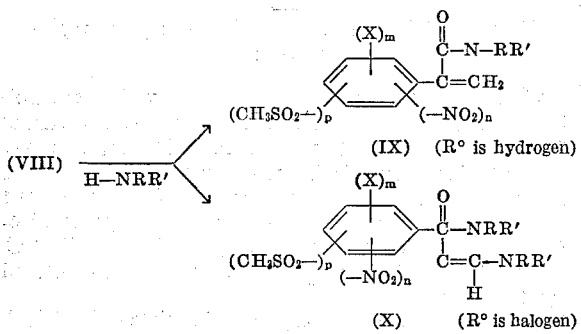

The symbols X, m, n, and p are as previously described in Formula I while R⁰ is either hydrogen or halogen. R is hydrogen or alkyl of 1–4 carbon atoms and R' is alkyl of 1–4 carbon atoms.

The hydrolysis of the amide (VI) is carried out by the known method of dissolving the amide in concentrated sulfuric acid, cooling the solution to about 5° C. and adding water solution of the sodium nitrite. The procedure is outlined in an article by Mann et al., in J. Chem. Soc. 1945, p. 751.

The acid chloride (VIII) is prepared from the acid (VII) by the known method of reacting the acid with thionyl chloride, preferably under reflux conditions in an organic solvent.

Primary and secondary amines of from 1–4 carbon atoms such as those previously described are used to convert the atropoyl chloride (VII) to either the N-substituted atropamide (IX) or the N-substituted β-alkylamino atropamide (X).

The reaction between the amine and atropoyl chloride is conveniently performed in an organic solvent at temperatures of from −10° C. to about 150° C. The two reactants, preferably dissolved in an organic solvent, are combined, and the reaction mixture is heated, if desired. In many cases the reaction proceeds at room temperature. The crystalline product formed is separated by conventional methods such as filtration, purified by recrystallization in a suitable solvent and dried.

The organic solvents used in preparing the β-alkylamino substituted atropamides of Formula V may also be used in this reaction. The molar ratio of amine/atropoyl chloride is dependent upon whether the atropoyl chloride is β-halogen substituted. When the atropoyl chloride is β-halogen substituted, i.e., R⁰ is halogen in Formula VIII, the amine is used in excess of the stoichiometric amount, preferably up to ten times in excess of the stoichiometric amount. For the β-unsubstituted atropoyl chloride, i.e., R⁰ is hydrogen in Formula VIII, the amine is added in nearly stoichiometric quantities or slightly in excess of stoichiometric quantities.

The following examples illustrate the method of preparing the atropamides of the invention and their herbicidal activity.

Example 1.—Preparation of alpha-chloromethyl-2,4-dichloromandelonitrile 105 grams (0.47 mole) of 2,2′,4′-trichloroacetophenone and approximately 0.5 milliliter of saturated, aqueous potassium cyanide were placed in a flask equipped with a water-cooled dropping funnel and a reflux condenser. 55 milliliters of liquid hydrogen cyanide was added rapidly, producing almost immediate solution of the solid ketone. A mild exothermic reaction occurred and HCN refluxed gently at 32° C. After about 15 minutes, the reaction subsided, and external heating was provided to maintain reflux at 30–32° C. for 30 minutes longer. The colorless solution was cooled to 25° C. and a few drops of concentrated sulfuric acid was added to stabilize the cyanohydrin. Excess HCN was removed under reduced pressure into a potassium hydroxide trap, the residual cyanohydrin solidifying. The product was triturated with hexane to remove traces of unreacted ketone and dried under vacuum to yield 113 grams of alpha-chloromethyl-2,4-dichloromandelonitrile, melting point: 97–98° C.

Analysis (percent by weight).—Calculated: C, 43.1; H, 2.4; Cl, 42.5. Found: C, 42.1; H, 2.5; Cl, 42.9.

Example II.—Preparation of beta, 2,4-trichloroatropamide (isomer melting at 101–102° C.)

15 grams (0.05 mole) of alpha-chloromethyl-2,4-dichloromandelonitrile was suspended in 100 milliliters of concentrated sulfuric acid and the mixture heated on a steam bath, the solid nitrile dissolving rapidly. After 30 minutes at 95° C., the solution was cooled and poured over 500 grams of cracked ice. The colorless solid product was filtered off, and recrystallized from carbon tetrachloride, yielding 12 grams of beta, 2,4-trichloroatropamide, melting point: 101–102° C.

Analysis (percent by weight).—Calculated: N, 5.6; Cl, 42.5. Found: N, 5.2; Cl, 42.8.

The identity of the product was confirmed by infra-red spectrum analysis and by nuclear magnetic resonance spectrum analysis.

Example III.—Preparation of 2,5-dichloroatropamide 15 grams (0.07 mole) of alpha-methyl-2,5-dichloromandelonitrile was heated with 100 milliliters of 80% sulfuric acid (132 grams of concentrated sulfuric acid diluted to 100 milliliters) at 90° C. for a period of 7 hours. The reaction mixture then was poured over ice. Recrystallization of the crude solid product from benzene, then drying, gave 9.5 grams of 2,5-dichloroatropamide, melting point: 132–133° C.

Analysis (percent by weight).—Calculated: N, 6.5; Cl, 32.8. Found: N, 6.4; Cl, 32.4.

The identity of the product was confirmed by infra-red spectrum analysis and nuclear magnetic spectrum analysis.

Examples IV–VI

Using the methods of the preceding examples, the following atropamides were prepared.

| Ex. | Atropamide | Melting point | Calculated N | Calculated Cl | Found N | Found Cl |
|---|---|---|---|---|---|---|
| IV | 2,4-dichloroatropamide | 164–165 | 6.5 | 32.8 | 6.3 | 33.1 |
| V | β,2,5-trichloroatropamide | 178–181 |  | 42.5 |  | 42.2 |
| VI | 2,4,5-trichloroatropamide | 170–173 | 5.6 | 42.5 | 5.5 | 42.3 |

Example VII.—Preparation of 2,5-dichloro-β-(methylamino)-atropamide 30 grams (0.12 mole) of β,2,5-trichloroatropamide was dissolved in a boiling solution of 200 milliliters of anhydrous benzene and 400 milliliters of absolute ethanol. This hot solution was then added in a slow stream to a stirred solution of 16 grams (0.51 mole) of anhydrous monomethylamine in 200 milliliters of anhydrous benzene. There action was completed at 55° C. in 2 hours, the solid gradually dissolving to provide a clear solution. Evaporation of most of the solvent led to coprecipitation of the product and the amine salt. The solids were washed with water to give a salt-free product which was recrystallized from a benzene-hexane solution (1:1 by volume) to yield 26 grams (90% yield) of 2,5-dichloro-β-(methylamino)-atropamide, melting point 161–163° C. The identity of the product was confirmed by infra-red spectrum analysis and by nuclear magnetic resonance spectrum analysis.

*Analysis* (percent by weight).—Calculated: Cl, 28.9; N, 11.4. Found: Cl, 29.2; N, 11.6.

Example VIII.—Preparation of 2,5-dichloroatropoyl-chloride 22 grams (0.1 mole) of 2,5-dichloroatropamide was dissolved in 95 milliliters of concentrated sulfuric acid and the solution was chilled to 5° C. in an ice bath. Nine grams (0.13 mole) of sodium nitrite in 30 milliliters of water was added gradually beneath the surface of the solution for a period of an hour, the solution being constantly stirred and the temperature remaining below 15° C. The mixture was then heated on a steam bath until the gas evolution ceased (4 hours). The solution was removed from the steam bath, allowed to cool, and then poured over ice. The product that precipitated out, was separated and recrystallized from carbon tetrachloride to yield 14 grams (64% yield) of colorless 2,5-dichloroatropic acid, melting point 148–149° C.

*Analysis* (percent by weight).—Calculated: Cl, 32.7; acid equivalent, 217. Found: Cl, 32.6; acid equivalent, 217.

The 2,5-dichloroatropoyl chloride was prepared in a yield of 90% by refluxing the acid with thionyl chloride in benzene. The oily product had a boiling point of 84–86° C. at 0.3 mm. Hg and a refractive index of $N_D^{25}$ 1.5780.

Example IX.—Preparation of 2,5-dichloro-N,N-dimethylatropamide 8 grams (0.034 mole) of 2,5-dichloroatropoyl chloride was dissolved in 70 milliliters of ether-benzene (1:1) and gaseous anhydride dimethylamine was slowly passed into the solution at room temperature until 3 grams (0.07 mole) had been added. The precipitated dimethylamine hydrochloride was removed by filtration and the organic phase was washer with water. Removal of the solvent under reduced pressure gave an oil (8 grams) which slowly crystallized to give 6 grams (73% yield) of colorless 2,5 - dichloro - N,N - dimethylatropamide, melting point 61° C.

*Analysis* (percent by weight).—Calculated: Cl, 29.1; N, 5.8; hydrogen equivalent, 244. Found: Cl, 28.6; N, 6.0; hydrogen equivalent, 241.

Example X.—Preparation of 2,5-dichloro-β-(methylamino)-N-methylatropamide

β-2,5-trichloroatropoyl chloride was prepared from β, 2,5-trichloroatropamide using the techniques described in Example VIII.

9 grams (0.033 mole) of β,2,5-trichloroatropoyl chloride was reacted with a ten-fold excess of monomethylamine in benzene at 0–27° C. The reaction yielded an orange oil, which when separated from the reaction mixture, solidified upon standing at room temperature. The 2,5 - dichloro-β-(methylamino)-N-methylatropamide, the identity of which was confirmed by infra-red spectrum analysis and nuclear magnetic resonance spectrum analysis, had a melting point of 79–82° C.

*Analysis* (percent by weight).—Calculated: Cl, 27.4; N, 10.8. Found: Cl, 27.3; N, 10.4.

Example XI.—Preparation of 2,4-dichloro-β-(dimethylamino)-N,N-dimethylatropamide 2,4 - dichloro-β-(dimethylamino)-N,N - dimethylatropamide, melting point 180–181° C. at 0.5 mm. Hg, was prepared in 70% from β,2,4-trichloroatropamide using the methods of Examples VIII and IX.

*Analysis* (percent by weight).—Calculated: N, 9.8; Cl, 24.7; hydrogen equivalent, 287. Found: N, 9.9; Cl, 25.0; hydrogen equivalent, 298.

Example XII.—Preparation of 4-(methylsulfonyl)-atropamide 22 grams (0.1 mole) of alpha - methyl-4-(methylsulfonyl)-mandelonitrile was gradually added with stirring to 150 milliliters of 96% sulfuric acid. The mixture was heated to 70° C. for 1½ hours and cooled to 0° C. in ice. Recrystallization of the crude product from water and then from methanol gave, after drying, 10 grams of 4-(methylsulfonyl)-atropamide, melting point 171–173° C.

The identity of the product was confirmed by infrared spectrum analysis.

*Analysis* (percent by weight).—Calculated: N, 6.2; S, 14.2; hydrogen equivalent, 225. Found: N, 5.6; S, 14.6; hydrogen equivalent, 222.

Example XIII.—Preparation of 4-chloroatropamide 100 grams (0.55 mole) of alpha-methyl-4-chloromandelonitrile was heated and stirred with 700 grams of 80% sulfuric acid at 35° C. for 18 hours and subsequently for 1 hour on a steam bath. The reaction mixture consisted of a sticky insoluble precipitate and yellow clear solution. The clear solution was cooled in ice. As crystallization from the water-ice mixture was unsuccessful, the crude product was extracted three times with 100 milliliters each of methylene chloride and then partially recrystallized from carbon tetrachloride to give 16 grams of 4-chloroatropamide, melting point 106–109° C.

The identity of the product was confirmed by infrared spectrum analysis.

*Analysis* (percent by weight).—Calculated: N, 7.7; Cl, 19.6; hydrogen equivalent, 181. Found: N, 8.0; Cl, 19.6; hydrogen equivalent, 181.

Example XIV.—Preparation of 4-nitroatropamide

About 3 grams of alpha-methyl-4-nitromandelonitrile was heated with an excess of concentrated sulfuric acid, cooled and poured over ice. After collecting the crude product, washing with ether and drying under reduced pressure, 2 grams of 4-nitroatropamide was obtained, melting point 182–183° C.

The identity of the product was confirmed by infrared spectrum analysis.

*Analysis* (percent by weight).—Calculated: C, 56.3; H, 4.2; N, 14.6; hydrogen equivalent, 48. Found: C, 54.6; H, 4.4; N, 12.6; hydrogen equivalent, 44.

2,3,5-trichloroatropamide and 2,4-dichloro - 5 - nitroatropamide were prepared as intermediate in the preparation of the corresponding atroponitriles of (P–3111 US, entitled "Pesticides" by Jerome G. Kuderna, Jr. filed on even rate herewith) copending Ser. No. 675,297, filed Oct. 16, 1967.

Example XV.—Herbicidal activity of the atropamides

Pre-emergence herbicidal activity was evaluated by planting weed seeds in soil treated with the test compounds at the rate of 10 pounds per acre. Seeds of watergrass (*Echinochloa crusgalli*) and cress (*Lepidum sativum*) were germinated in treated soil under controlled conditions of temperature and light for 10 to 11 days prior to evaluation of the effectiveness of the treatment. At this time, the germination was noted and the treatments were rated on a 0 (no effect) to 9 (all dead) scale. The results are summarized in Table 1.

Post-emergence herbicidal activity was evaluated by spraying dilute suspensions of the compounds in a 1:1 mixture of acetone and water with 0.5% wetting agent on crabgrass (*Digitaria sanguinalis*) and pigweed plants (*Amaranthus sp.*) grown under controlled conditions. After the plants were held for 10 to 11 days, they were rated for treatment effect on a 0 (no effect) to 9 (all dead) scale. The results are set forth in Table 1.

TABLE 1

| Atropamide | Pre-emergence | | Post-emergence | |
|---|---|---|---|---|
| | Water-grass | Cress | Crab-grass | Pigweed |
| 2,5-dichloroatropamide | 2 | 7 | 0 | 5 |
| 2,5-dichloro-N,N-dimethyl-atropamide | 8 | 7 | 7 | 7 |
| 2,4-dichloro-β-(dimethylamino)-N,N-dimethylatropamide | 8 | 9 | 4 | 6 |
| 2,4-dichloroatropamide | 4 | 8 | 0 | 0 |
| β,2,5-trichloroatropamide | 5 | 5 | 0 | 0 |
| 2,5-dichloro-β-(methylamino)-atropamide | 2 | 8 | 1 | 2 |
| 2,4,5-trichloroatropamide | 1 | 2 | 0 | 0 |
| β,2,4-trichloroatropamide [1] | 6 | 5 | 0 | 6 |
| β,2,4-trichloroatropamide [2] | 5 | 6 | 7 | 7 |
| 4-(methylsulfonyl)-atropamide | 1 | 6 | 0 | 0 |
| 4-chloroatropamide | 1 | 9 | 6 | 2 |
| 4-nitroatropamide | 3 | 0 | 0 | 0 |

[1] Melting point 131.5–132° C.
[2] Melting point 101–102° C.

We claim as our invention:

1. The atropamide of the formula

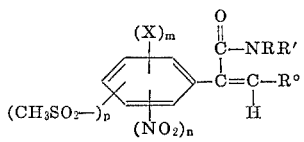

wherein
R⁰ is hydrogen, halogen selected from the group consisting of fluorine, chlorine, bromine and iodine or —NR²R³ in which R² is alkyl of 1–4 carbon atoms and R³ is hydrogen or alkyl of 1–4 carbon atoms;
R and R' are hydrogen or alkyl of 1–4 carbon atoms; X is halogen; $m=0-4$, $n=0-2$, $p=0-2$ and $$m+n+p=1-4$$

with the provisos that when R⁰ is halogen, R and R' are hydrogen, and that at least one of the ortho positions is unsubstituted.

2. The atropamide of claim 1 wherein any halogen present is middle halogen selected from the group consisting of chlorine and bromine.

3. The atropamide of claim 2 wherein $m$ and $n$ are zero.

4. The atropamide of claim 2 wherein $m$ and $p$ are zero.

5. The atropamide of claim 2 wherein $n$ and $p$ are zero.

6. The atropamide of claim 2 wherein R⁰ is hydrogen or middle halogen selected from the group consisting of chlorine and bromine and R and R' are both hydrogen.

7. The atropamide of claim 6 wherein $m$ and $n$ are zero.

8. The atropamide of claim 6 wherein $m$ and $p$ are zero.

9. The atropamide of claim 6 wherein $n$ and $p$ are zero.

10. The atropamide of claim 9 wherein X is chlorine and $m$ is 2 or 3.

11. The atropamide of claim 1 wherein R⁰ is hydrogen or middle halogen selected from the group consisting of chlorine and bromine, R and R' are both hydrogen, X is middle halogen, $p$ is 0 and $m$ is 1–4; with the proviso that one of the two ortho positions is halogen substituted and the other is unsubstituted.

12. The atropamide of claim 11 wherein R⁰ is hydrogen or chlorine, X is chlorine and $n$ is 0.

13. The atropamide of claim 12 wherein R⁰ is chlorine and the substituted phenyl ring is 2,4-dichlorophenyl.

14. The atropamide of claim 12 wherein R⁰ is chlorine and the substituted phenyl ring is 2,5-dichlorophenyl.

15. The atropamide of claim 12 wherein R⁰ is hydrogen and the substituted phenyl ring is 2,5-dichlorophenyl.

16. The atropamide of claim 12 wherein R⁰ is hydrogen and the substituted phenyl ring is 2,4-dichlorophenyl.

References Cited

UNITED STATES PATENTS 3,361,790   1/1968   Allen et al. _____ 260—558

HENRY R. JILES, Primary Examiner
H. I. MOATZ, Assistant Examiner

U.S. Cl. X.R.
71—118; 260—465, 518, 544